Nov. 26, 1929.  W. M. REYNOLDS  1,737,519
CULTIVATOR
Filed June 22, 1926   4 Sheets-Sheet 1

Inventor:
W. M. Reynolds
By Monroe C. Miller
Attorney.

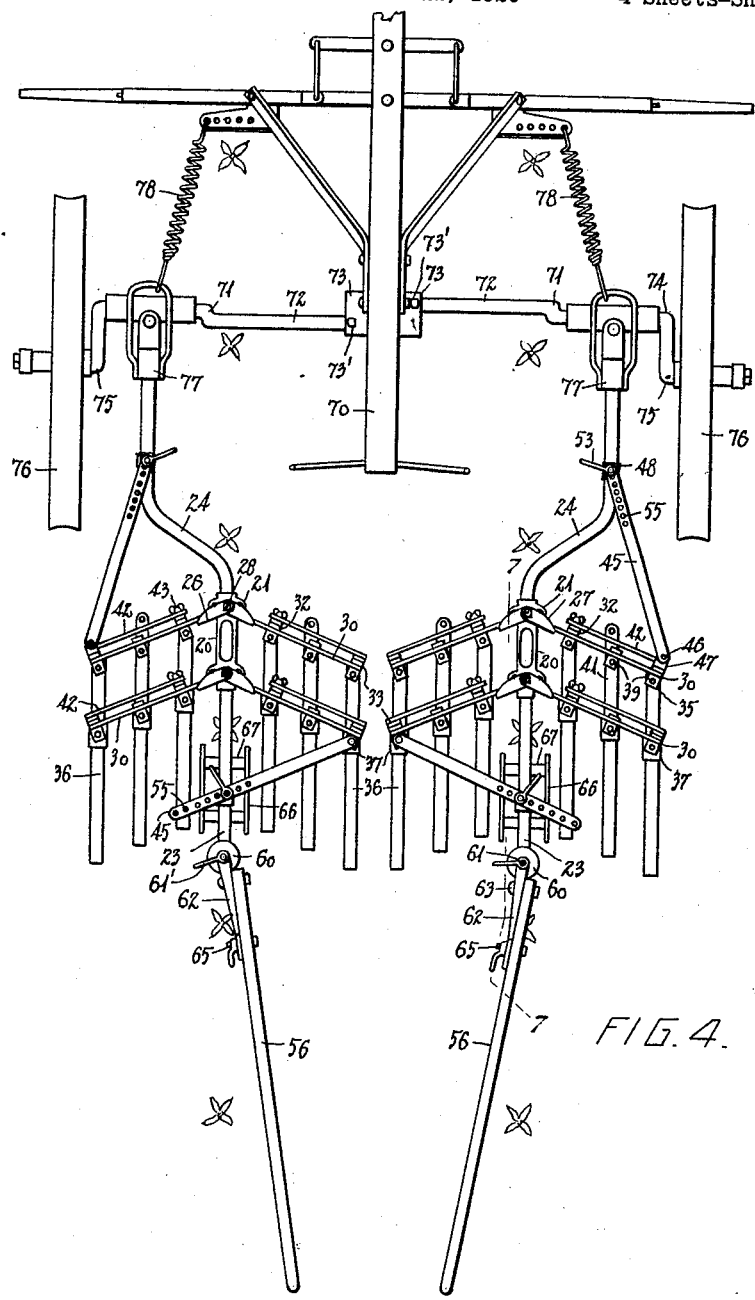

Nov. 26, 1929.  W. M. REYNOLDS  1,737,519
CULTIVATOR
Filed June 22, 1926  4 Sheets-Sheet 4
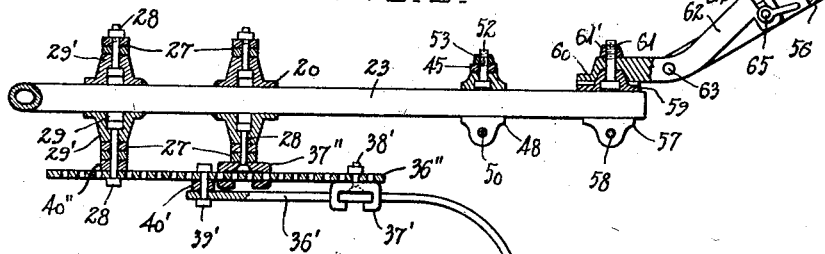
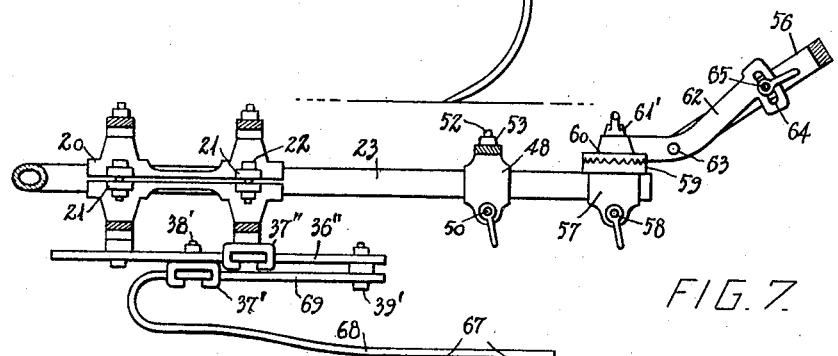
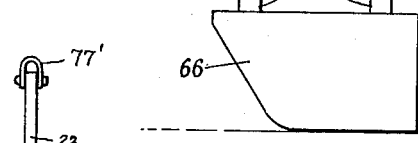
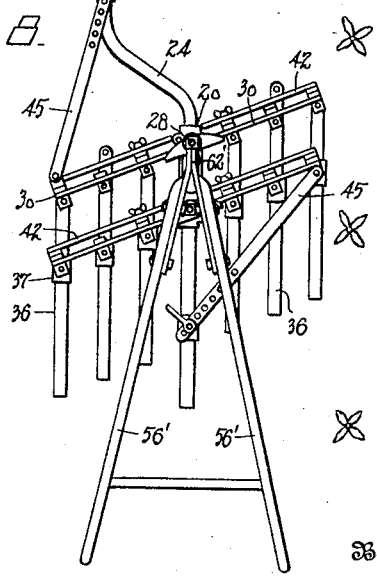
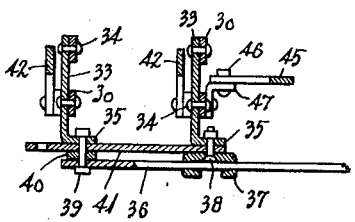

Patented Nov. 26, 1929

1,737,519

UNITED STATES PATENT OFFICE

WALTER MONROE REYNOLDS, OF HATTIESBURG, MISSISSIPPI

CULTIVATOR

Application filed June 22, 1926. Serial No. 117,781.

The present invention relates to cultivators, and one object of the invention is the provision of a cultivator comprising a novel construction and assembly of the component elements whereby the cultivator may be adjusted for a wide range of use, permitting the teeth to operate in the furrows or trenches between the rows of plants or over the ridges and rows of plants, with the rows spaced different distances apart.

Another object is the provision of cultivator attachments that may be applied to the wheel mounted axle or arch of an ordinary cultivator for converting the cultivator from a single row cultivator into a two row cultivator, and, further, to enable the soil to be worked either between the rows of plants or over said rows.

A further object is the provision of a pair of complementary cultivator units, each having a set of adjustable teeth that may be positioned to work in furrows or trenches or on ridges, as well as on plane surfaces, in combination with novel means for connecting the sets of teeth with a wheel mounted axle, arch or frame to provide for novel adjustments of the sets of teeth relatively to one another.

A still further object is the provision of a cultivator of the kind indicated wherein one of the cultivator units may be used by itself in an advantageous manner for a single row cultivator.

Still another object is the provision of a cultivator unit having a center tooth or member and novel means for mounting same for adjustment with reference to the other teeth.

It is also an object of the invention to improve the cultivator generally in its construction and details to enhance the utility and efficiency thereof, and to enable the cultivator to be adjusted for various conditions and requirements.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 4 is a plan view of the cultivator adjusted as shown in Fig. 2.

Fig. 5 is an enlarged vertical section taken substantially on the line 5—5 of Fig. 3.

Fig. 6 is an enlarged sectional detail taken substantially on the line 6—6 of Fig. 3.

Fig. 7 is an enlarged vertical section taken substantially on the line 7—7 of Fig. 4.

Fig. 8 is a plan view showing one of the cultivator units by itself as a single row cultivator.

Figure 1:
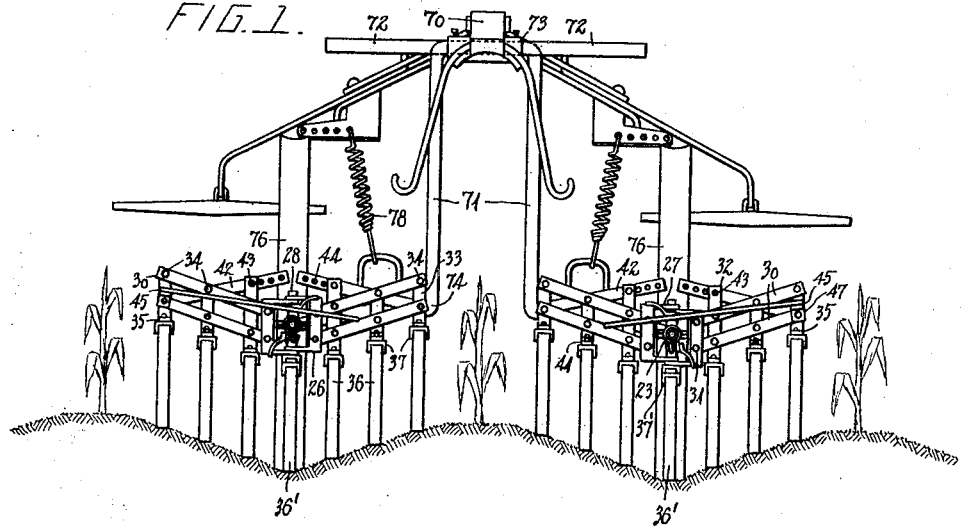
Figure 1 is a rear view of the improved cultivator, with the handles removed, showing the two cultivator units adjusted to operate in the furrows or trenches between the rows of plants.

The present cultivator comprises two units each of which comprises a clamping sleeve 20 which is split lengthwise so as to have upper and lower sections, and such sections have the outstanding ears 21 at their opposite edges through which the clamping bolts 22 extend for clamping the sleeve on the tubular metal beam 23, and said beam, as hereinafter more fully set forth, has an offset 24 between its ends, so that the forward and rear terminal portions of the beam are disposed in spaced parallel lines.

The adjustable mounting for the teeth or blades includes longitudinal spaced pairs of vertical wings or plates 26 having at their upper and lower ends the ears or tongues 27 overlapping each other above and below the beam. Said ears or portions 27 are pivotally connected with the sleeve 20, so that the wings 27 may be swung forwardly and rearwardly with reference to the beam about vertical axes. Thus, bolts 28 connect said overlapping ears with the sleeve, and said bolts have heads 29 at those ends adjacent to the beam seated within recesses in the sections of the sleeve, as seen in Fig. 5. The sleeve 20 has bosses 29' in which the heads 29 of the bolts are seated, and the corresponding ears 27 bear against said bosses. The bolts 28 are therefore anchored to the sleeve, and the ears 27 being fitted on the protruding terminals of the bolts 28 are prevented from becoming accidentally detached from the sleeve even though the nuts on the outer ends of the bolts become loosened or lost.

A pair of parallelogram arms or bars 30 is carried by each wing 26, so that said arms project in pairs to opposite sides from the beam. The inner ends of said arms overlap the wings 26 and are pivoted thereto at vertically spaced points by means of the rivets 31, whereby said arms may be swung upwardly and downwardly on the horizontal axes of the rivets 31, and are swingable forwardly and rearwardly with the wings 26 about the vertical axes of the bolts 28. To each pair of arms 30 there are pivoted at spaced points different distances from the beam, standards 32 and 33 crossing said arms and pivoted thereto by means of rivets 34. Each pair of arms 30 and its standards 32 and 33 form a parallelogram which maintains said standards vertical in all positions of the arms when raised and lowered on the pivots 31. The standards 32 and 33 are provided at their lower ends with the rearwardly extending feet 35 for the attachment of the bars 36 which extend forwardly and rearwardly under the front and rear standards. The bars 36 are slidable through carrier members 37 which have bolts or pivot elements 38 engaging through the feet 35 of the rear standards, and the forward terminals of the bars 36 are pivotally secured to the feet 35 of the forward standards by means of the bolts 39, as seen more clearly in Fig. 6. In this way, the bars 36 are pivotally connected to the lower ends or feet of the standards, and the bars 36 are also slidable in the members 37 should this sliding movement be necessary owing to the forward and rearward adjustment of the arms 30. The rear portions of the bars 36 are curved downwardly to provide the spring teeth, and may have blades or shoes of any desired kind. Ordinary spring teeth may be used by sliding them through the carrier members 37 and fastening them by the bolts 39.

The two pairs of arms 30 at each side of the beam are connected to provide a parallelogram comprising the two parallelograms defined by the arms 30 and their standards 32 and 33. For this purpose, a spacing bar or link 41 is disposed above the intermediate bar 36 of the bars at each side of the beam, and the rear terminals of the bars 41 fit between the respective carrier members 37 and feet 35 and pivotally engage the bolts 38, while the forward terminals of the bars 41 pivotally engage the respective bolts 39 between the feet 35 of the corresponding standards 33 and the forward ends of the corresponding bars 36. These bars 41 thus serve as spacers and links connecting the arms 30 to hold said arms parallel longitudinally of the cultivator, so that each group of arms will swing forwardly and rearwardly as a unit. The bars 41 connect the pairs of arms 30 at the opposite sides of the beam to provide compound parallelograms, whereby the standards 32 and 33 are maintained vertical in all adjustments of the bars 36, and whereby said bars 36 are maintained longitudinally in all positions. In view of the fact that the bars 41 form spacing connections between the pairs of arms 30, the bars 36 are relieved of this duty, and if the pivots 38 and 39 are not true with respect to the parallelogram motion, then the bars 36 may slide slightly in the carrier members 37 when adjustments are made, and thus avoid the parts binding.

A center tooth bar 36' is used between the two side groups of teeth of each unit, as shown in Figs. 1 and 5. This bar 36' is connected with the sleeve 20 so as to have a comparatively long adjustment longitudinally of the beam, in order that the center tooth may be positioned either in transverse alinement with the side teeth or may be positioned in front or in rear of the side teeth, so as to let lumps of dirt, roots, and other accumulations pass between the center tooth and the adjacent side teeth. A longitudinal supporting bar 36'' carries the bar 36' and has a longitudinal series of apertures. The forward lower bolt 28 is engaged through one of said apertures of the bar 36'' and said bar extends through a carrier member 37'' held by the rear lower bolt 28, as seen in Fig. 5, a spacer 40'' being disposed on the front lower bolt 28 between the bar 36'' and the corresponding ears 27 to position the bar 36'' parallel with the beam 23. By disengaging the bar 36'' from the forward lower bolt 28, the bar 36'' may be adjusted longitudinally to different positions relatively to the sleeve 20 and beam 23. The bar 36' extends through a carrier member 37' fastened to the bar 36'' by the bolt 38', and the terminal of the bar 36' is secured to the bar 36'' by a bolt 39', a spacer 40' being disposed on said bolt 39' between the bars 36' and 36''. Not only can the bar 36'' be adjusted longitudinally, but the bolt 39' and carrier member 37' may be adjusted longitudinally of the bar 36'', so as to obtain a large longitudinal adjustment of the center tooth, the apertures of the bar 36'' being adapted to receive the bolts 38' and 39' and the forward lower bolt 28 with the bars 36' and 36'' in different longitudinal positions relatively to one another and relatively to the sleeve 20 and beam 23.

As shown, there are three teeth in each group at each side of the beam of each unit, although different numbers of teeth may be used. The center tooth of each unit may be adjusted so as to be offset forwardly or rearwardly with reference to the teeth of the side groups.

Figure 2:
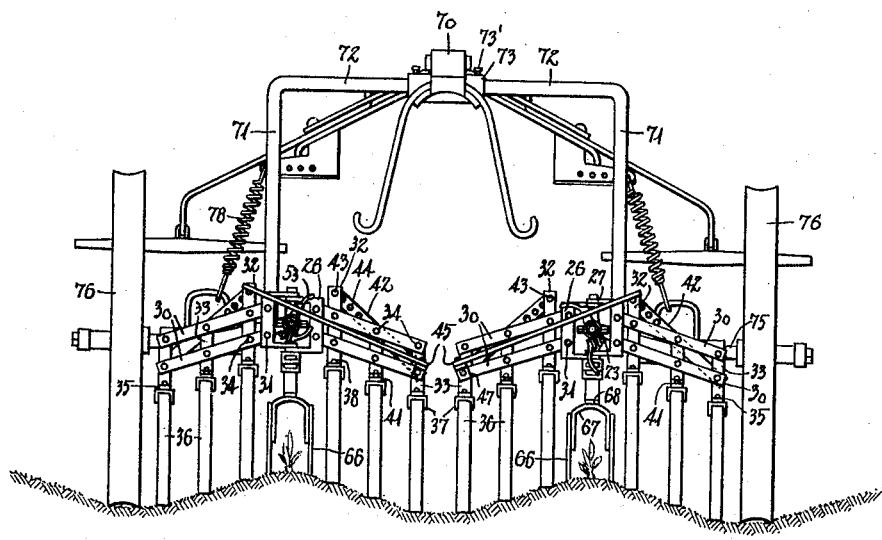
Fig. 2 is a corresponding view showing the cultivator units adjusted to operate over the rows of plants and ridges, with guards substituted for the central teeth as shown in Fig. 1.
Figure 3:
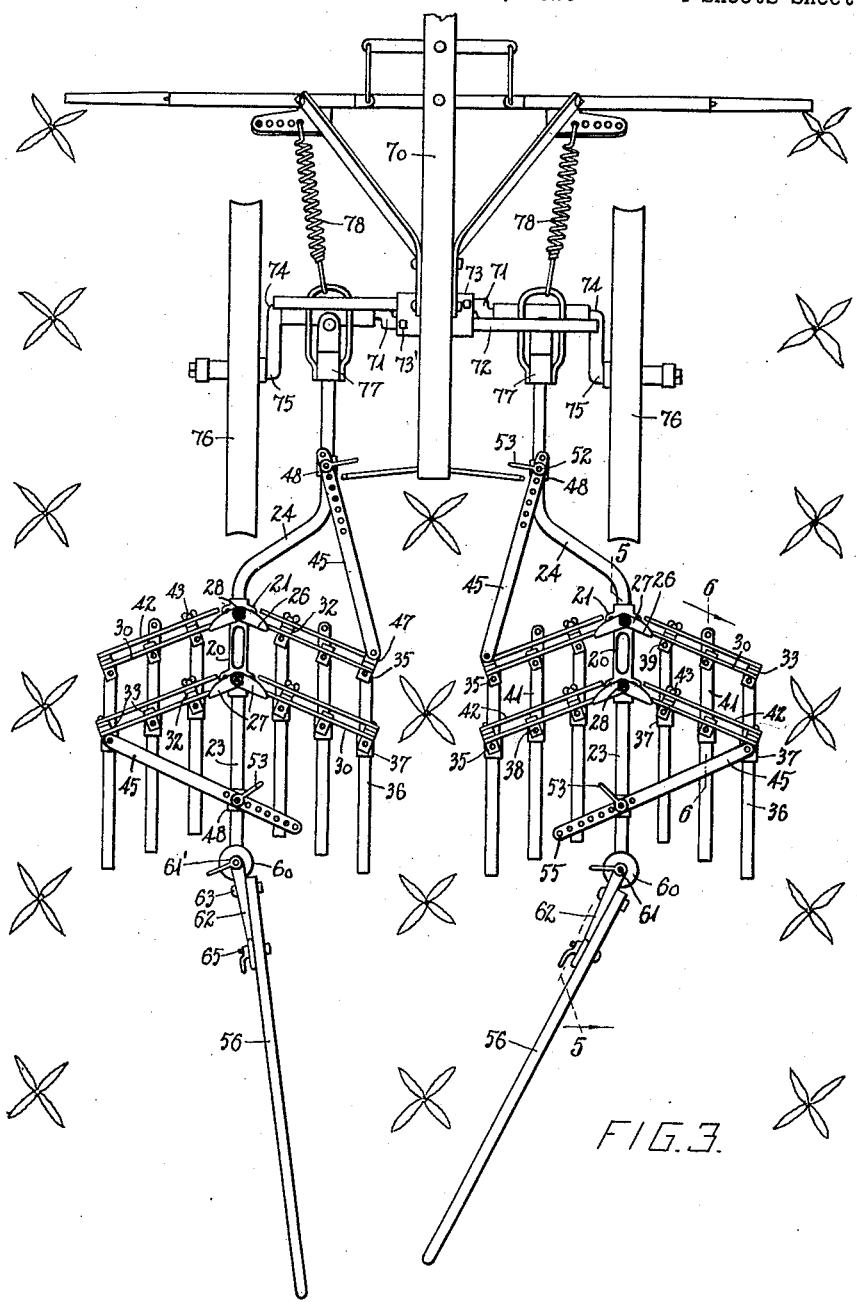
Fig. 3 is a plan view of the cultivator adjusted as shown in Fig. 1.

The double parallelogram adjustment of each group of teeth enables the cultivator to be used under various conditions of the soil. When the cultivator is used on level soil, the arms 30 are adjusted to horizontal position, so that the points of the teeth will be in substantially the same horizontal plane. When the cultivator is used in furrows or trenches, the arms 30 are adjusted upward, as seen in Fig. 1, so that the teeth will work the soil properly in and along the sides of the furrows. When the cultivator is used over the ridges or beds, the arms 30 are adjusted downwardly, as seen in Fig. 2, so that the teeth are disposed astride the ridge. These adjustments can be made in any position of the arms 30 longitudinally, and at any vertical position of said arms, they may be swung forwardly and rearwardly for longitudinal adjustment, it being apparent that when the arms 30 are swung toward and away from the beam 23, the teeth are moved closer together and further apart transversely. Furthermore, when the arms 30 are at right angles with the beam, the teeth will be in transverse alinement, and when the arms are swung forwardly and rearwardly, the teeth will extend diagonally forward or rearward, respectively, as may be desired. As shown in Figs. 3 and 4, the arms 30 extend rearwardly. The arms at one side of the beam of each unit may also be adjusted downwardly and the arms at the opposite side adjusted upwardly. Various other adjustments may be made so that the teeth conform to the lay of the soil.

In order to hold the arms 30 in their different vertical adjustments, a brace 42 is provided for each pair of arms, and the braces are inclined inwardly toward the beam. The lower outer ends of the braces 42 are pivotally engaged to the lower outer rivets 34, and said braces extend upwardly and inwardly and are provided with apertures 44 receiving clamping bolts 43 carried by the upper terminals of the standards 32 which project above the arms 30. The bolts 43 may be removed to permit the braces 42 to be adjusted when the arms 30 are raised and lowered.

In order to hold the arms 30 in their longitudinal adjustments, oblique braces 45 are provided, one at the front and the other at the rear of the several pairs of arms 30 of each unit. The outer ends of the braces 45 are pivoted, as at 46, to angle pieces 47 which engage the corresponding rivets 34, thereby providing flexible or universal joints between said braces and the arms 30. The angle piece 47 of the front brace 45 engages the lower outer rivet 34 of the front pair of one group of arms, while the angle piece 47 of the rear brace 45 engages the outer lower rivet 34 of the rear arms of the other group. The braces 45 may be swung toward and away from the arms 30, and the braces 45 may also turn with the angle pieces 47 about the corresponding rivets 34, whereby the braces can accommodate different adjustments of the arms 30.

Each of the braces 45 is adjustably clamped to the corresponding beam 23 by means of a clamp 48 embracing the beam. The clamp is split and has a clamping bolt 50 which may be tightened for securing the clamp in place on the beam, the clamp being slidable and rotatable on the beam when the bolt 50 is loosened. The clamp 48 has an upstanding bolt or pivot 52, the head of which is seated and anchored in the clamp, as seen in Fig. 5, and the brace 45 has apertures 55 to engage the bolt or pivot 52 in the different adjustments of said brace. A nut 53 is threaded on the bolt 52 for securing the brace 45 thereon. The clamps 48 may be adjusted to different longitudinal positions on the beam 23, or the braces 45 may be adjusted longitudinally of themselves relatively to the clamps, and said clamps may turn on the beams 23 when the arms 30 are adjusted upwardly and downwardly.

By having one brace 45 of each unit in front and the other in rear of the arms 30, both braces may be accommodated without interference, it being noted that the braces extend across the beam and that each brace has an individual clamp on the beam.

Handles 56 are secured on the rear terminals of the two beams 23, when the cultivator is used as a walking cultivator, in order that the two sets of teeth may be adjusted laterally and vertically as the cultivator moves along the rows of plants. A clamp 57 embraces the rear terminal of each beam 23 and is split, similar to the clamp 48, and has a clamping bolt 58 for tightening the clamp 57 on the beam, said clamp 57 being slidable and rotatable on the beam when the bolt 58 is loosened. The clamp 57 has a notched seat 59 thereon on which a notched member 60 bears. An upstanding bolt 61 has a head seated and anchored within the clamp 57, as seen in Fig. 5, and the member 60 is adjustable around the bolt 61. A nut 61' is threaded on the bolt 61 to clamp the member 60 on the seat 59. The member 60 has a rearwardly and upwardly extending bracket 62, to which the lower end of the corresponding handle 56 is pivoted, as at 63, to enable the handle to be adjusted upwardly and downwardly. The bracket 62 has a slot 64 receiving a clamping bolt 65 carried by the handle 56 in order that the handle may be clamped to the bracket 62 in different inclined positions, to suit the operator. By loosening the nuts 61' the handles 56 and members 60 may be adjusted about the vertical axes of the bolts or pivots 61. In this way, the handles may be adjusted upwardly and downwardly and transversely to be conveniently manipulated.

The two cultivator units may be used as attachments for an ordinary cultivator, as seen in Figs. 1, 2, 3 and 4. There is illustrated a conventional wheel mounted frame of a cultivator, comprising the tongue 70 mounted on an arched axle which is composed of two sections or parts. Each section of the axle or arch has a vertical portion 71 at one side of the tongue 70 and an upper transverse portion 72 projecting toward the opposite side. The portions 72 pass slidably through a double bearing 73 secured to the tongue 70 and having set screws 73′ for clamping the axle sections in different transverse adjustments. Said axle sections may be adjusted toward and away from one another to decrease and increase the width of the arch, as well known. The axle sections have the outwardly extending portions 74 at the lower ends of the vertical portions 71, and the outstanding spindles 75 projecting from the portions 74 and on which the ground wheels 76 are mounted for rotation, so that the axle is carried by said wheels. Beam sockets 77 are pivotally connected with the portions 74 and extend rearwardly therefrom to receive the forward ends of the cultivator beams, and springs 78 are connected with the sockets 77 in the well known manner to assist in supporting the cultivator beams. The wheel mounted structure comprising the parts 70 to 78, inclusive, is well known, and the present cultivator units may be attached to such a structure or similar ones that are in use.

The two cultivator units when attached to the beam sockets 77 will convert an ordinary single row cultivator into a two row cultivator. Referring to Figs. 1 and 3, it will be noted that the forward ends of the beams 23 are secured in the sockets 77 with the rear terminals of the beams offset laterally away from one another to be disposed directly in rear of the wheels 76, and the teeth are adjusted to work in the furrows or trenches between three rows of plants. The arched axle may be adjusted to space the wheels 76 and cultivator units apart the desired distance according to the spacing of the rows of plants, and the arms 30 are adjusted upwardly and rearwardly, as seen in Figs. 1 and 3, respectively, so that the teeth will operate effectively on the sides of the ridges, to loosen the soil and work same toward the plants.

As shown in Figs. 2 and 4 the cultivator units move over the rows of plants and ridges. This is accomplished in widening the arch by separating the axle sections, and the beams 23 are positioned so that their rear terminals are offset inwardly toward one another. This enables the wheels 76 to travel in furrows or on the ridges with the axle astride two rows of plants. The arms 30 are adjusted downwardly so that the teeth work on the opposite sides of two ridges, as seen in Fig. 2. In changing from the adjustment shown in Fig. 3 to the adjustment shown in Fig. 4, the cultivator units may be interchanged, using the right unit in Fig. 3 at the left in Fig. 4, and the left hand unit in Fig. 3 at the right in Fig. 4. It is also possible to adjust the beams 23 angularly in the sockets 77 to position the rear terminals of the beams above or below the horizontal plane of the forward terminals of the beams. With the rear terminals of the beams offset either outwardly or inwardly, as shown in Figs. 3 and 4, respectively, the beams may be turned to raise and lower the rear terminals thereof. Thus, as shown in Fig. 1 the rear terminals of the beams are lower down than the forward terminals, whereas in Fig. 2 the rear terminals are higher up than the forward terminals.

When the cultivator units are used over the rows of plants, as seen in Figs. 2 and 4, the center tooth of each unit is removed and replaced by a guard or shield to protect the plants. This guard, as shown in Figs. 2, 4 and 7, comprises side plates 66 to move on the ridge at the opposite sides of the plants, and connected by yokes 67 on which a bar 68 is secured. The bar 68 extends forwardly and is bent back to have the rearwardly extending portion 69 to engage the carrier member 37′ and bolt 39′ which are reversed as compared with the arrangement shown in Fig. 5. The bar 36″, carrier member 37′ and bolt 39′ thus serve for the attachment of the guard as well as the center tooth, and the guard may be adjusted forwardly and rearwardly. The bar 68 is resilient so as to press the plates 66 down on the ground. The guard is adjusted so as to prevent the dirt being thrown against or over the plants.

One of the cultivator units may be used by itself as a single row cultivator, as shown in Fig. 8. A clevis 77′ or other coupling member is connected to the forward end of the beam 23 for hitching a draft animal to the beam, and a pair of handles 56′ is connected to the front upper bolt 28, said handles having a crotch member 62′ to engage said bolt. The arms 30 are adjusted so as to be disposed obliquely at substantially the same angle in plan, so as to operate on the corresponding side of the ridge at one side of the row of plants. The forward terminal of the beam 23 is offset away from the row of plants so that the draft animal may move in the center of the row or trench while the rear terminal of the beam is offset toward the row of plants along which the teeth move.

Having thus described the invention, what is claimed as new is:—

1. A cultivator comprising a sleeve to fit on a beam, teeth at opposite sides of and connected to the sleeve, a carrier member carried by the sleeve, a bar below the sleeve slidable in said carrier member and adjustably connected with said sleeve, a carrier member adjustably connected with said bar, soil engaging means including a bar slidable in the second-named carrier member, and means for adjustably connecting said bars.

2. A cultivator comprising teeth to be disposed at opposite sides of a beam, means for connecting said teeth with said beam, a carrier member supported by said means to be disposed below the beam, a bar to be disposed longitudinally below the beam and slidable through said carrier member and adjustably connected with said means, a carrier member adjustably connected with said bar, soil engaging means including a bar slidable through the second-named carrier member, and means adjustably connecting said bars.

3. A cultivator comprising a wheel-mounted frame, a rearwardly extending beam, means connecting the forward terminal of said beam with the frame for the rotary adjustment of the beam about the axis of said terminal, the rear terminal portion of said beam being offset so as to be adjusted upwardly and downwardly and transversely by said rotary adjustment of the beam, teeth, and means carrying said teeth fitted rotatably on the rear terminal portion of the beam.

4. A cultivator comprising a wheel-mounted frame, a pair of rearwardly extending beams, means connecting the forward terminals of said beams with the frame for the rotary adjustment of the beams about the axes of said terminals, the rear terminal portions of the beams being offset to be adjusted toward and away from one another and upwardly and downwardly by the rotary adjustment of the beams about said axes, sleeves fitted for rotation on the rear terminal portions of the beams, and teeth carried by said sleeves.

In testimony whereof I hereunto affix my signature.

WALTER MONROE REYNOLDS.